June 25, 1957 — N. C. QUALEY — 2,797,306
WELDING GUN STRUCTURE
Filed Aug. 17, 1954
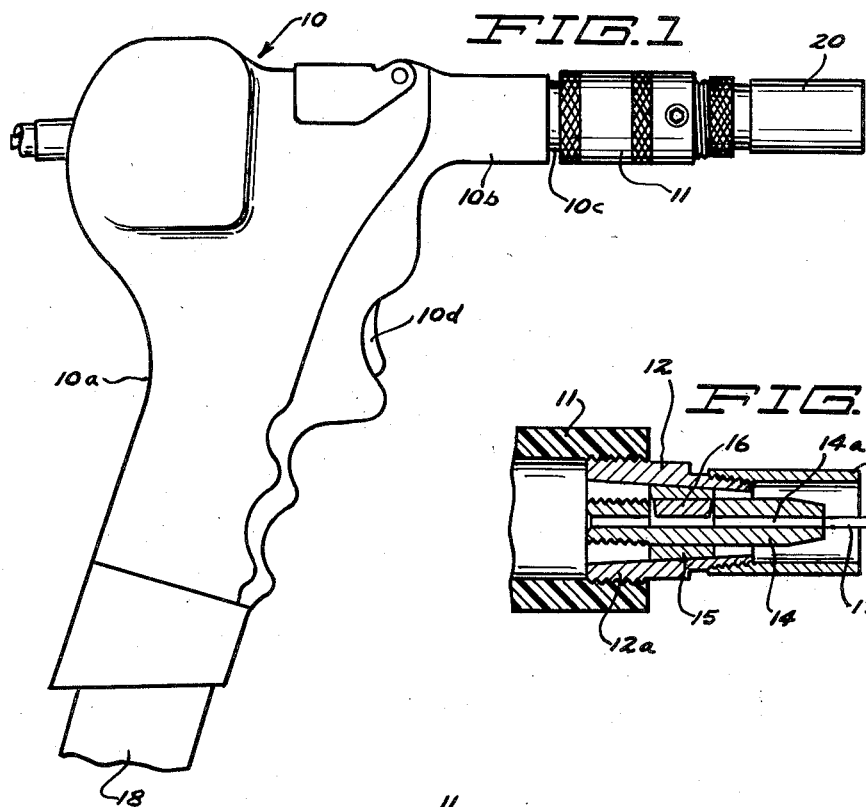
INVENTOR.
NORMAN C. QUALEY
BY
Chas. C. Reif.

2,797,306

WELDING GUN STRUCTURE

Norman C. Qualey, Minneapolis, Minn., assignor to Northern Ordnance Incorporated, Minneapolis, Minn., a corporation of Minnesota Application August 17, 1954, Serial No. 450,409

4 Claims. (Cl. 219—130)

This invention relates to an electric welding gun, and while the invention could be embodied in various types of welding guns or torches, in the embodiment of the invention illustrated it is shown as applied to a welding gun of the pistol grip type.

In certain welding guns a gas nozzle body or nozzle body is provided, together with a wire or electrode guiding member or contact tube disposed within said nozzle body and usually recessed a short distance inside the end of said nozzle body, said tube having a passage therein through which a metal wire or electrode is fed. Said metal wire is commonly of the same metal as the part or work to be welded. A rather heavy electrical current is passed through the wire and the same forms an electrode making an arc with the work in the welding operation. With the use of a heavy current a high temperature is produced at the work and thus adjacent said nozzle body. This temperature is such that the end of the nozzle body is quite soon burned or disintegrated to such an extent as to be unfit for further use. When this occurs, said nozzle body must be replaced. Said nozzle body is a machine made part and thus rather expensive.

It is an object of this invention to provide a curved nozzle and contact tube for a standard gun or torch for welding in places where accessibility is difficult or impossible with a straight nozzle and contact tube.

It is another object of the invention to provide an inexpensive replaceable end for the gas nozzle for straight as well as curved nozzles. During the welding operation extreme heat is produced at the end of the contact guide tube and gas nozzle and this causes the end of the gas nozzle to burn off and become damaged by arcing. The rest of the gas nozzle rarely becomes worn or damaged so by replacing the damaged end there is a considerable saving. Said gas nozzle end may be attached to said gas nozzle in various ways, such as by being threaded thereon or being held frictionally thereon.

These and other objects and advantages of the invention will be fully set forth in the following description made in connection with the accompanying drawings in which like reference characters refer to similar parts throughout the several views and in which:

Fig. 1 is a view in side elevation of a welding torch of the pistol grip type;

Fig. 2 is a partial central vertical section of the device shown in Fig. 1; and

Fig. 3 is a view similar to Fig. 2, showing a modification.

Referring to the drawing, a welding gun 10 of the pistol grip type is disclosed having a handle portion 10a which can be gripped in the hand of the operator. Said gun has a projecting lug 10b having a portion 10c which is threaded to have secured thereto a threaded coupling member 11. Member 11 is shown as cylindrical in form and has knurled portions on its periphery so that it can be easily gripped and turned. A gas nozzle body or nozzle 12 is provided having an inner threaded portion 12a which is engaged by the outer end of the coupling sleeve 11. A wire or electrode guiding member generally called a contact guide tube or contact tube 14 is provided, the same extending through member 12. Tube 14 has a central passage or bore 14a therein. A conducting wire forming an electrode 17 is fed through the passage 14a in tube 14 and this is moved along by a mechanism not shown, which is operated by a trigger 10d on the torch. Member 14 has an opening or slot in one side and a movable metal member 16 is disposed in said opening. Member 16 is held against wire 17 by a resilient member, such as a rubber band or bushing which holds or draws member 16 against wire 17 at all times and thus presses said wire into good contact with contact tube 14. The electric current thus passes readily from contact tube 14 to wire 17. A conduit 18 is secured to the lower end of handle 10a and communicates with the opening or passage through portion 10b and the members 11 and 12. An inert gas is delivered through conduit 18 and the same passes through said passage in nozzle 12 and around contact tube 14 so that a body of said gas surrounds members 14 and 17. In accordance with the present invention a simple gas nozzle replaceable straight tip 20 is provided, the same being of cylindrical form and the same is detachably secured to the end of nozzle body 12. As shown in Fig. 2, the end of the nozzle body 12 is tapered and threaded and tip 20 is threaded onto member 12. Member 20, as shown, encloses the end portion of the tube 14. Alternatively the tip 20 could fit over the end of nozzle body 12 and be held on the same by friction, as shown in Fig. 3, to be later described.

In operation, a rather heavy electrical current of low voltage is passed through the wire 17. The tube 14 is brought quite close to the work and an arc is formed between the wire 17 and the work to produce the weld. An inert gas, such as argon or helium, is passed through conduit 18 and through member 12 and about nozzle 14 to shield the end portion of the heat of nozzle from the said arc and the weld puddle. The members 12 and 14 act to form an annular body of said inert gas about electrode 17. The members 12 and 20 act to form an annular body of said inert gas about member 14 and electrode 17. In the use of such welding guns trouble has been experienced in that the arcing and high temperature burns and disintegrates the end of the contact tube 14 and often the end of the nozzle body 12. When parts 12 and 14 are thus injured, it is necessary to replace the same. Said parts are machine made and are rather expensive.

To overcome the above difficulty the applicant conceived of the disclosed structure involving the member 20. Member or gas nozzle replaceable tip 20 protects the end of nozzle body 12 and the contact tube 14 from the extreme heat so that the same are not injured. Member 20 is most affected by the heat and when this member is burned or disintegrated it can easily be replaced. Said member 20 is very simple in construction and is inexpensive. By the use of the simple member 20 a great saving is made in not having to replace the more expensive parts 12 and 14.

In Fig. 3 a modification is shown which comprises the parts 11 and 12 already described and a contact guide tube or contact tube member 21. Tube 21 projects from member 12 and is curved through a substantial angle. This curved contact guide tube or contact tube 21 has great utility in working in places where accessibility is difficult or impossible with a straight contact tube. A simple gas nozzle replaceable curved tip 22 is provided and the same fits over the end of nozzle body 12 and is frictionally held thereon. In the embodiment of the invention illustrated, tip 22 has its end engaging member 12 somewhat enlarged. Tip 22 is curved so as to enclose nozzle 21 and be spaced therefrom.

In operation, member 22 will protect tube 21 and nozzle body 12 just as does the tip 20 already described.

It will be seen that tip 22 has to be so constructed that it can be detached by moving longitudinally of nozzle 21. It cannot be rotated to disengage it and thus cannot be threaded on nozzle body 12. Since the curved contact tube causes a good contact between wire 17 and contact tube 21 the members 15 and 16 are not needed.

From the above description it will be seen that I have provided a simple, inexpensive and very efficient means for protecting the contact tube and nozzle body of a welding gun. The device, as above stated, effects a great saving in that the standard parts of the torch are not injured by the heat and do not have to be replaced. It is a cheap and easy operation to replace the tips 20 and 22. The curved contact guide tube 21 and the gas nozzle replaceable curved tip 22 add greatly to the utility and efficiency of the gun.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. A welding torch having in combination, a rigid handle having a terminal connecting portion, a coupling secured at one end to said portion, a nozzle spaced from said portion and secured to the other end of said coupling, said nozzle constituting a rather expensive machine-made member, an electrode guiding tube secured in said nozzle and projecting beyond the end thereof, said nozzle having a passage surrounding said electrode guiding tube for conducting an inert gas about said tube, said nozzle having an outer round exterior and a protecting member of simple pipe-like form surrounding and engaging said exterior, the same surrounding said tube and projecting beyond the end of said nozzle and tube so as to receive any damage resulting from the heat of welding so that said nozzle is not damaged.

2. A welding torch structure having in combination, a rigid handle having a terminal connecting portion, a coupling connected at one end to said portion, a nozzle connected to the other end of said coupling so that said coupling is between said portion and nozzle, an electrode guiding tube disposed in said nozzle, said nozzle having an annular passage therein surrounding said electrode guiding tube for conducting an inert gas about said electrode guiding tube and having a smooth outer surface and a simple cheap cylindrical sleeve fitting on the end of said nozzle and engaging said surface and held thereon by friction, said sleeve projecting beyond said nozzle and around said electrode guiding tube.

3. The structure set forth in claim 2, said sleeve and electrode guiding tube being curved through a substantial arc so that the axis of said sleeve and tube are at an angle to the axis of said nozzle.

4. A welding torch having in combination, a handle, a discharge nozzle, a member to which the inner end of said nozzle is connected having a passage extending longitudinally therethrough, said nozzle having an annular passage therein communicating with said passage, said nozzle constituting a machine-made expensive member, an electrode guiding tube connected to said nozzle, said last mentioned passage surrounding said tube for conducting an inert gas about said tube, said nozzle having a round outer surface and a cheap simple pipe-like easily removable sleeve engaging said surface and surrounding said nozzle and tube for protecting said nozzle from the heat of welding.

References Cited in the file of this patent

UNITED STATES PATENTS

| | | |
|---|---|---|
| 2,289,938 | Smith | July 14, 1942 |
| 2,379,470 | Baird | July 3, 1945 |
| 2,510,205 | Baird | June 6, 1950 |
| 2,555,017 | Tuthill | May 29, 1951 |
| 2,606,267 | McElrath | Aug. 5, 1952 |